United States Patent

[11] 3,608,069

| [72] | Inventor | George Herbert Fuller<br>Colonia, N.J. |
|---|---|---|
| [21] | Appl. No. | 809,019 |
| [22] | Filed | Mar. 20, 1969 |
| [45] | Patented | Sept. 21, 1971 |
| [73] | Assignee | Colgate-Palmolive Company<br>New York, N.Y. |

[54] SIALAGOGUE
17 Claims, No Drawings

[52] U.S. Cl. .................................................. 424/52,
99/140
[51] Int. Cl. .................................................. A61k 7/16
[50] Field of Search .......................................... 424/49–58;
99/140

[56] References Cited
UNITED STATES PATENTS

| 3,181,952 | 5/1965 | Mastrangelo.................. | 99/71 |
| 3,296,079 | 1/1967 | Griffin.......................... | 424/49 |

FOREIGN PATENTS 1,462,193  11/1966  France

*Primary Examiner*—Richard L. Huff
*Attorneys*—Herbert S. Sylvester, Murray M. Grill, Norman Blumenkopf, Ronald S. Cornell, Thomas J. Corum, Richard N. Miller and Robert L. Stone

ABSTRACT: A sialagogue composition particularly suitable for use in an oral preparation. The sialagogue contains perillartine as a sweetener and methylene chloride as a flavoring agent. The methylene chloride may be used in mixture with a nontoxic perfluoro saturated hydrocarbon.

SIALAGOGUE

This invention relates to a sialagogue composition particularly characterized by a rapidly developing initial sweetness upon contact with the oral cavity and a simulation of the taste of chloroform. These pleasant characteristics remain present even after contact with the oral cavity is complete and do not leave an undesirable aftertaste.

Sialagogues, such as sweeteners and flavors, have been used to promote desired taste characteristics. Thus, such substances have been employed in oral preparations in order to promote a desirable taste in the oral cavity.

Calcium cyclamate and saccharin have been commonly employed as sweetening agents in foods, beverages and dentifrices. However, these and other sweetening agents may be substantive to tissue in the oral cavity of many individuals and thereby cause an undesirable aftertaste. Inclusion of agents which mask such aftertaste in compositions containing sweeteners has been proposed in order to overcome this problem, but these have not been found to be practical.

Likewise chloroform has been proposed and used commonly in order to promote a desirable flavor, particularly to dentifrices due to its unusual flavor which is immediately evident upon contact with the oral cavity. However, the use of chloroform too may present certain problems such as its narrow safety range.

It is an object of this invention to provide a sialagogue composition which yields immediate sweetness and simulates the taste of chloroform. Further objects will be apparent from consideration of the following specification.

In accordance with certain of its objects this invention relates to a sialagogue composition comprising perillartine and methylene chloride.

Perillartine, also known as 1-perillaldehyde alpha antioxime, is a naturally occurring sweetener which may be isolated from the essential oil of the plant *Perilla frutescans*. It is an extremely powerful sweetener, being 2,000 times as sweet as sucrose and four to eight times as sweet as saccharin.

The presence of perillartine in the sialagogue of the instant invention provides a transitory rapidly developing intensive and pleasant chloroform sweetness upon contact with the oral cavity. It may be employed in the form isolated or in a solvent such as ethanol.

Methylene chloride (dichloromethane), the flavor component of the instant sialagogue, contributes its own effect to the composition simulating the ethereal effect of chloroform and apparently interacts with the perillartine sweetener to produce additional highly desirable and unexpected characteristics.

In accordance with certain preferred aspects of the invention, the simulation of the ethereal effect of chloroform is increased by mixing the methylene chloride with nontoxic perfluoro saturated hydrocarbon.

When methylene chloride and optionally the perfluoro saturated hydrocarbon are present in a sialagogue composition which also contains perillartine, the simulated chloroform ethereal effect pleasantly combines with the rapidly developing sweetness of perillartine to successfully imitate pure chloroform. Moreover, this desirable taste having perillartine sweetness and chloroform ethereal flavor effect simulation is particularly suited as a flavor.

The perfluoro saturated hydrocarbon present in the sialagogue is the type of material commonly employed as a propellant and is typically stored under pressure. Storage is typically at low temperature, say about 5° C.–15° C. It contributes an ethereal character to the flavor. The perfluoro saturated hydrocarbon which is nontoxic, typically contains two to six carbon atoms and is acyclic (two to six carbon atoms) or cyclic (three to six carbon atoms) i.e., hexafluoroethane, octafluoropropane, decafluorobutane, dodecafluoropentane, tetradecafluorohexane, hexafluorocyclopropane, octafluorocyclobutane, decafluorocyclopentane and dodecafluorocyclohexane. The preferred perfluorocyclohydrocarbon is octafluorocyclobutane (Freon C-38).

Generally, the components of the sialagogue provide their desirable taste when the composition contains about 0.25–20 parts, preferably about 0.3–1.2 parts by weight of perillartine; about 80–99.75 parts, preferably about 98.8–99.7 parts by weight of methylene chloride and, when employed, about 0.5–3.0 parts, preferably about one part by weight of perfluoro saturated hydrocarbon for each 100 parts by weight of methylene chloride present.

In accordance with certain aspects of this invention, the sialagogue components are incorporated into a carrier material to provide for contact with the oral cavity. Thus, based on the entire composition, typically the sialagogue composition contains about 0.01–0.20 percent, preferably about 0.01–0.03 percent by weight of perillartine; about 1.0–4.0 percent, preferably about 2.5–3.5 percent by weight of methylene chloride; and, when employed, about 0.5–3.0 parts, preferably about one part by weight of perfluoro saturated hydrocarbon for each 100 parts by weight of methylene chloride present.

The carrier material may be any material for which, when brought into contact with the oral cavity, it is desired to provide a pleasant sweet and biting taste such as is characteristic of the composition of the instant invention. Typically, such a carrier is a dentifrice or mouthwash. The sialagogue generally comprises about 1.0–10.0 percent by weight, preferably about 3.0–4.0 percent of the total composition.

The oral compositions normally have a pH between about 5 and 9 and preferably about 6–7. If desired, the pH may be maintained with a buffering system.

When the carrier material is a dentifrice there is present therein a substantially water-insoluble polishing agent of the type commonly employed in dental creams, chewable tablets and powders. There is a relatively large number of such materials known in the art. Representative materials include, for example, dicalcium phosphate, tricalcium phosphate, insoluble sodium metaphosphate, aluminum hydroxide, magnesium carbonate, calcium carbonate, calcium pyrophosphate, calcium sulfate, polymethyl methacrylate, bentonite, etc., including suitable mixtures thereof. It is preferred to use the water-insoluble phosphate salts as the polishing agents and, more particularly, insoluble sodium metaphosphate and/or a calcium phosphate such as dicalcium phosphate dihydrate.

The polishing agent may be the sole carrier material, particularly when the dentifrice is a toothpowder. Typically, other ingredients are present in the carrier and the amount of polishing agent is up to about 95 percent by weight of the carrier. In the case of a dental cream or chewable tablet the polishing agent is generally about 20–75 percent by weight of the carrier and in a toothpowder it is generally about 70–95 percent by weight of the carrier.

In the preparation of a toothpowder it is usually sufficient to admix mechanically the ingredients of the carrier with methylene chlorine to which the fluorohydrocarbon has been added and with perillartine.

In dental cream formulations, the liquids and solids should necessarily be proportioned to form a creamy mass of desired consistency which is extrudable from a pressurized container or a collapsible, e.g., aluminum or lead, tube. In general, the liquids in the dental cream will comprise chiefly water, glycerine, aqueous solutions of sorbitol, propylene glycol, polyethylene glycol 400, etc., including suitable mixtures thereof. It is advantageous usually to use a mixture of both water and a humectant or binder such as glycerine or sorbitol. The total liquid content will generally be about 20–75 percent by weight of the carrier. It is preferred to use also a gelling agent in dental creams such as the natural and synthetic gums and gumlike materials, e.g., Irish moss, gum tragacanth, sodium carboxymethyl cellulose, polyvinylpyrrolidone, starch, and the like, usually in an amount up to about 10 percent, and preferably about 0.2–5 percent of the carrier. The components of the sialagogue of the invention are blended into such dental cream formulation.

In chewable dental tablets the solids and liquids are proportioned similarly to the amounts in dental creams and the sialagogue is blended with the solids and liquids. A waxy matrix such as polyethylene glycol having a molecular weight of about 6,000 is also present, generally in amount of about 4–20 percent by weight, in order to facilitate forming a tablet of desired size and shape.

In other oral preparations, such as mouthwashes and the like, the carrier is an aqueous vehicle which may comprise about 20–99 percent by weight of the preparation. Typically, the vehicle also includes about 5–30 percent by weight of a nontoxic alcohol, such as ethanol.

Organic surface-active agent may be used in the carrier of the present invention to assist in achieving thorough and complete dispersion of the instant compositions throughout the oral cavity, and render the instant compositions more cosmetically acceptable. The organic surface active material may be anionic, nonionic, ampholytic, or cationic in nature, and it is preferred to employ as the surface-active agent a detersive material which imparts to the composition detersive and foaming properties. Suitable such detergents are water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, alkyl aryl sulfonates, such as sodium dodecyl benzene sulfonate, higher alkyl sulfoacetates, higher fatty acid ester of 1,2 dihydroxy propane sulfonates, and the substantially saturated higher aliphatic acyl amides of lower aliphatic amino carboxylic acid compounds, such as those having 12 to 16 carbons in the fatty acid, alkyl or acyl radicals, and the like. Examples of the last-mentioned amides are N-lauroyl sarcosine, and the sodium, potassium, and ethanolamine salts of N-lauroyl, N-myristoyl or N-palmitoyl sarcosinates, which should be substantially free from soap or similar higher fatty acid material which tends to substantially reduce the effect of these compounds. The use of these sarcosinate compounds in dentifrice compositions of the present invention is particularly advantageous since these materials exhibit a prolonged and marked effect in the inhibition of acid in the oral cavity due to carbohydrates, in addition to exerting some reduction in the solubility of tooth enamel in acid solutions.

Other suitable surface-active materials include nonionic agents such as condensates of sorbitan monostearate with approximately 60 moles of ethylene oxide, condensates of ethylene oxide with propylene oxide condensates of propylene glycol ("Pluronics") and cationic surface-active germicides and antibacterial compounds such as di-isobutylphenoxyethoxyethyl dimethyl benzyl ammonium chloride, benzyl dimethyl stearyl ammonium chloride, tertiary amines having one fatty alkyl group (of from 12 to 18 carbon atoms) and two (poly)oxyethylene groups attached to the nitrogen (typically containing a total of from about 2 to 50 ethenoxy groups per molecule) and salts thereof with acids, and compounds of the structure

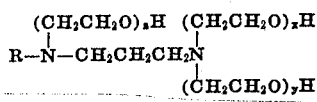

where $R$ is a fatty alkyl group containing from about 12 to 18 carbon atoms, and $x$, $y$ and $z$ total three or higher, as well as salts thereof with mineral or organic acids.

It is preferred to use the surface-active agent in amount of about 0.05–5 percent by weight of the carrier.

Various other materials also may be incorporated in the carrier. Examples thereof are coloring or whitening agents, preservatives, silicones, chlorophyll compounds, ammoniated materials such as urea, diammoniumphosphate and mixtures thereof, and other constituents. These adjuvants are incorporated in the instant compositions in amounts which do not substantially adversely affect the properties and characteristics suitably selected and used in proper amount depending upon the particular type of preparation involved.

It may be desirable too to include antibacterial agents in the carrier, typically in amount of about 0.01 percent–5 percent, preferably about 0.05–1.0 percent, by weight of the carrier. Typical antibacterial agents include:

$N^1$-(4-chlorobenzyl)-$N^5$-(2,4-dichlorobenzyl) biguanide;
p-chlorophenyl biguanide;
4-chlorobenzhydryl biguanide;
4-chlorobenzhydrylguanylurea;
N-3-lauroxypropyl-$N^5$-p-chlorobenzylbiguanide,
1,6-di-p-chlorophenylbiguanidohexane;
1-(lauryldimethylammonium)-8(p-chlorobenzyl-dimethylammonium octane dichloride;
5,6-dichloro-2-guanidinobenzimidazole;
$N^1$-p-chlorophenyl-$N^5$-laurylbiguanide;
5-amino-1,3-bis(2-ethylhexyl)-5-methylhexahydro pyrimidine;
and their nontoxic acid addition salts.

In addition to the sialagogue of the instant invention, additional flavoring or sweetening materials, of the type commonly employed in dentifrices, may be included in the carrier. Such materials, if present, aid in modifying the particular taste of the sialagogue in the manner desired. Examples of such additional materials include the flavoring oils, e.g., oils of spearmint, peppermint, wintergreen, sassafras, clove, sage, eucalyptus, marjoram, cinnamon, lemon and orange, as well as sodium methylsalicylate. Suitable sweetening agents include sucrose, lactose, maltose, sorbitol, sodium cyclamate and saccharine. Suitably, flavor and sweetening agent may together comprise about 0.01–2.0 percent of the carrier.

The carrier suitably may contain a fluorine-containing compound having a beneficial effect on the care and hygiene of the oral cavity, e.g., diminution of enamel solubility in acid and protection of the teeth against decay. Examples thereof include sodium fluoride, stannous fluoride, potassium fluoride, potassium stannous fluoride ($SnF_2 \cdot KF$), sodium hexafluorostannate, stannous chlorofluoride, sodium fluorozirconate, and sodium monofluorophosphate. These materials, which dissociate or release fluorine-containing ions in water, suitably may be present in the carrier in an effective but nontoxic amount, usually within the range of about 0.01 to 1 percent by weight of the water-soluble fluorine content thereof.

The following specific examples are further illustrative of the nature of the present invention but it is to be understood that the invention is not limited thereto. Amounts and proportions in the examples are by weight unless otherwise indicated.

EXAMPLE 1

Three parts of a pressurized composition (at about 0.77 kgs./cm.$^2$) containing 99 percent methylene chloride and 1 percent octafluorocyclobutane and 1.50 parts of a solution of 2 grams of perillartine in 28 cc. of absolute ethanol are blended at 4.5° C. with the following dental cream carrier:

| Components | Parts |
| --- | --- |
| Glycerine (99.3%) | 25.7 |
| Tetrasodium Pyrophosphate | 0.25 |
| Carboxymethyl Cellulose | 0.75 |
| Sodium Benzoate | 0.5 |
| Water | 14.6 |
| Sodium Lauryl Sulfate | 1.0 |
| Sodium N-Lauroyl Sarcosinate | 0.7 |
| Dicalcium Phosphate | 46.7 |
| Calcium Carbonate | 5.0 |

When the teeth are brushed with this composition an intense pleasant taste in which the flavor of chloroform is simulated quickly develops and remains present in the oral cavity throughout the time of tooth brushing and for a short period thereafter.

In the above example, octafluorocyclobutane may be replaced by hexafluoroethane, hexafluorocyclopropane, tetradecafluorohexane and dodecafluorocyclohexane.

EXAMPLE 2

Three and two-tenths parts of a pressurized composition (at about 0.77 kgs./cm.$^2$) containing 99.0 percent methylene chloride and 1.0 percent octafluorocyclobutane and 0.40 part of a solution of 2 grams of perillartine in 28 cc. of absolute ethanol are blended at 4.5° C. with the following dental cream carriers:

| Components | A | B |
|---|---|---|
| Glycerine | 28.5 | 25.1 |
| Irish Moss | 1.3 | 1.3 |
| Tetrasodium Pyrophosphate | | 0.25 |
| Sodium Benzoate | 0.15 | 0.5 |
| Saccharine | | 0.2 |
| Sodium Lauryl Sulfate | 1.5 | 1.0 |
| Water | 17.4 | 13.9 |
| Sodium N-Lauroyl Sarcosinate | 2.0 | 2.0 |
| Stannous Fluoride | 0.4 | |
| Sodium Monofluorophosphate | | 0.76 |
| Dicalcium Phosphate | 15.0 | 46.7 |
| Calcium Carbonate | | 5.0 |
| Insoluble Sodium Metaphosphate | 30.6 | |
| Color | 0.4 | |

When the teeth are brushed, a taste develops similar to the taste which develops with example 1.

EXAMPLE 3

Three and two-tenths parts of the pressurized composition of example 2 are blended with the following chewable dental tablet carrier:

| Components | Parts |
|---|---|
| Dicalcium Phosphate | 76.1 |
| Sodium Lauryl Sulfate | 0.5 |
| Hydrogenated Coconut Oil Monoglyceride Sulfate Sodium Salt | 1.2 |
| Di-isobutyl Phenoxyethoxyethyl Dimethylbenzyl Ammonium Chloride | 0.1 |
| Polyethylene Glycol 6000 | 10.0 |
| Starch | 2.5 |
| Carboxymethyl Cellulose | 1.25 |
| Silicon Dioxide | 1.25 |
| Polyvinyl Alcohol | 2.9 |
| Talc | 2.0 |

During chewing of this tablet and brushing of the teeth, an intense pleasant taste in which the flavor of chloroform is simulated quickly develops and remains in the oral cavity throughout the time of contact and for a short period thereafter.

EXAMPLE 4

Three and two-tenths parts of the pressurized composition of example 2 are blended with the following mouthwash carrier:

| Components | Parts |
|---|---|
| Ethyl Alcohol (95%) | 14.8 |
| Sorbitan Monostearate Polyoxyethylene Condensate Containing About 80 Moles of Ethylene Oxide | 2.5 |
| Glycerine (99.3%) | 10.0 |
| Water | 71.6 |
| Color | 0.6 |
| Citric Acid | 0.03 |

During washing of the mouth with this composition an intense taste in which the flavor of chloroform is simulated quickly develops and remains in the oral cavity throughout the time of contact and for a short period thereafter.

EXAMPLE 5

Ninety-seven parts of methylene chloride is mixed with three parts of a solution of 2 grams of perillartine in 28 cc. of absolute ethanol and blended with the dental cream carrier set forth in example 1.

When the teeth are brushed with this composition an intense pleasant taste in which the flavor of chloroform is simulated quickly develops.

It will be apparent to those skilled in the art that various modifications may be made to the specific compositions described and equivalents substituted therefor.

I claim:

1. A sialagogue composition comprising about 0.25–20 parts by weight of perillartine and about 80–99.75 parts by weight of methylene chloride.

2. The sialagogue composition of claim 1 wherein a nontoxic perfluoro saturated hydrocarbon containing two to six carbon atoms is also present and said composition comprises about 0.5–3.0 parts by weight of perfluoro saturated hydrocarbon for each 100 parts by weight of methylene chloride present.

3. The sialagogue composition of claim 2 wherein said nontoxic perfluoro saturated hydrocarbon is a perfluorocyclohydrocarbon containing three to six carbon atoms.

4. The sialagogue composition of claim 2 wherein said fluorocarbon is octaperfluorocyclobutane.

5. The sialagogue composition of claim 1 wherein there is present a carrier for the perillartine and methylene chloride and said sialagogue comprises about 1.0–10 percent by weight of the total composition.

6. The sialagogue composition of claim 5 wherein said composition comprises about 0.01–0.20 percent by weight of perillartine and about 1.0–4.0 percent by weight of methylene chloride.

7. The sialagogue composition of claim 5 wherein said composition also comprises about 0.5–3.0 parts by weight of perfluoro saturated hydrocarbon for each 100 parts of methylene chloride present.

8. The sialagogue composition of claim 5 wherein said carrier is an aqueous vehicle.

9. The sialagogue composition of claim 8 wherein said aqueous vehicle contains about 5–30 percent by weight of a nontoxic alcohol.

10. The sialagogue composition of claim 5 wherein said carrier includes a water-insoluble dental polishing agent, which polishing agent is about 20–95 percent by weight of the carrier.

11. The sialagogue composition of claim 10 wherein said carrier includes a dentally beneficial fluorine-containing compound, which fluorine-containing compound is present in an amount necessary to provide 0.01–1 percent by weight of the carrier of water-soluble fluorine.

12. The sialagogue composition of claim 11 wherein said fluorine-containing compound is selected from the group consisting of stannous fluoride and sodium monofluorophosphate.

13. A sialagogue composition comprising about 0.3–1.2 parts by weight of perillartine, about 98.8–99.7 parts by weight of methylene chloride and about one part by weight of perfluoro saturated hydrocarbon containing two to six carbon atoms for each 100 parts by weight of methylene chloride present.

14. A sialagogue composition comprising about 0.01–0.03 percent by weight of perillartine, about 2.5–3.5 percent by weight of methylene chloride, octafluorocyclobutane in the amount of about one part by weight of octafluorocyclobutane for each 100 parts of methylene chloride present and a dentifrice carrier including a substantially water-insoluble dental polishing agent.

15. The sialagogue composition of claim 14 wherein said dentifrice carrier includes a dentally beneficial fluorine-containing compound.

16. The sialagogue composition of claim 15 wherein said fluorine-containing compound is stannous fluoride.

17. The sialagogue composition of claim 15 wherein said fluorine-containing compound is sodium monofluorophosphate.